United States Patent [19]

Sutton et al.

[11] 4,140,887
[45] Feb. 20, 1979

[54] METHOD FOR MICROWAVE HEATING

[75] Inventors: Willard H. Sutton; Walter E. Johnson, both of Clinton, N.Y.

[73] Assignee: Special Metals Corporation, New Hartford, N.Y.

[21] Appl. No.: 795,344

[22] Filed: May 9, 1977

[51] Int. Cl.² ........................................... H05B 9/06
[52] U.S. Cl. ..................... 219/10.55 M; 219/10.55 E; 264/66
[58] Field of Search ............... 219/10.55 E, 10.55 R, 219/10.55 M, 10.55 F; 264/56, 64, 66; 432/247

[56] References Cited

U.S. PATENT DOCUMENTS

| | | | |
|---|---|---|---|
| 3,469,053 | 9/1969 | Levinson | 219/10.55 E |
| 3,539,751 | 11/1970 | Levinson | 219/10.55 E |
| 3,701,872 | 10/1972 | Levinson | 219/10.55 E |
| 3,777,099 | 12/1973 | Levinson | 219/10.55 E |
| 3,859,493 | 1/1975 | Peterson | 219/10.55 M |
| 3,974,354 | 8/1976 | Long | 219/10.55 E |
| 4,013,798 | 3/1977 | Goltsos | 219/10.55 E X |
| 4,015,085 | 3/1977 | Woods | 219/10.55 E |
| 4,057,702 | 11/1977 | Lacombe-Allard | 219/10.55 M X |

Primary Examiner—Arthur T. Grimley
Attorney, Agent, or Firm—Vincent G. Gioia; Robert F. Dropkin

[57] ABSTRACT

An object responsive to microwave energy is enclosed in a thermally insulated enclosure which is substantially transparent to microwave energy and is heated by microwave energy passing through the enclosure. The apparatus includes a chamber which supports the magnetron radiators and has thermal insulated walls and an insulated base on which the object rests.

4 Claims, 2 Drawing Figures

METHOD FOR MICROWAVE HEATING

This invention relates to a method for microwave heating and more particularly to heating materials, such as ceramic refractory castings, to high temperatures.

The theory and practice of microwave heating is well known and need not be described herein. However, we wish to point out that the frequency spectrum which can be used for the microwave heating of an object is higher than radio waves and much lower in frequency than infrared or visible light. The effect of these microwaves on various materials vary. Materials can be classified into three general classes with respect to behavior when exposed to microwave energy. These are (1) reflective, (2) transparent and (3) absorbant. Metals and some other materials which fall into the first class act somewhat as a mirror and reflect the microwaves. Materials which act somewhat as glass and are transparent to the microwaves (microwave energy) so that they can pass therethrough fall in the second class. Still other materials which are absorbant to the microwaves fall in the third class. Few materials are completely transparent or absorbant so that in most cases materials of the second class will absorb some microwave energy and materials of the third class will not absorb all the microwave energy. However, it is generally considered that materials which can be heated a substantial amount by microwaves fall into the third class. The heating rate is influenced by mass, weight, shape and composition.

Microwave heating is presently used for cooking foods, drying molds, curing plastics and rubber, drying spaghetti, etc. industrial processes where much higher temperatures are required and it has not been possible to use microwave heating for those processes. One such process relates to the manufacture of ceramic refractory products such as bricks. For example, products are made by adding 8 to 15 percent water to a dry Calcium Aluminate-alumina powder refractory mix, the percentage of added water depending upon the fineness of the powder and other factors, to form a wet mix. The wet mix is then cast into molds, and the material is allowed to "set up" in the molds at room temperature for a minimum of 8 to 24 hours depending upon the water content, air temperature and humidity. After the castings are set, they are removed from the molds while retaining about 90% of the added water. The castings are then allowed to dry at room temperature for 16 to 24 hours. The castings then may be stored or fired by placing the air-dried castings into an oven operating at 500° F for a period of 4 hours to remove the water therefrom. The castings are then removed and transferred to a high temperature gas or electric furnace operating at approximately 2200° F and kept in the furnace for a period of 4 hours, after which they are air cooled at ambient temperature for a period of 4 hours to 8 hours. It will be seen that this is a long and tedious process.

It is therefore an object of our invention to provide a method of heating materials by means of microwaves to much higher temperatures than previously found possible.

Another object is to provide such a method wherein ceramic refractory castings are fully fired.

A further object is to provide apparatus for heating materials by microwaves to temperatures much higher than previously found possible.

These and other objects will be more apparent after referring to the following specification and attached drawings in which.

Figure 1:
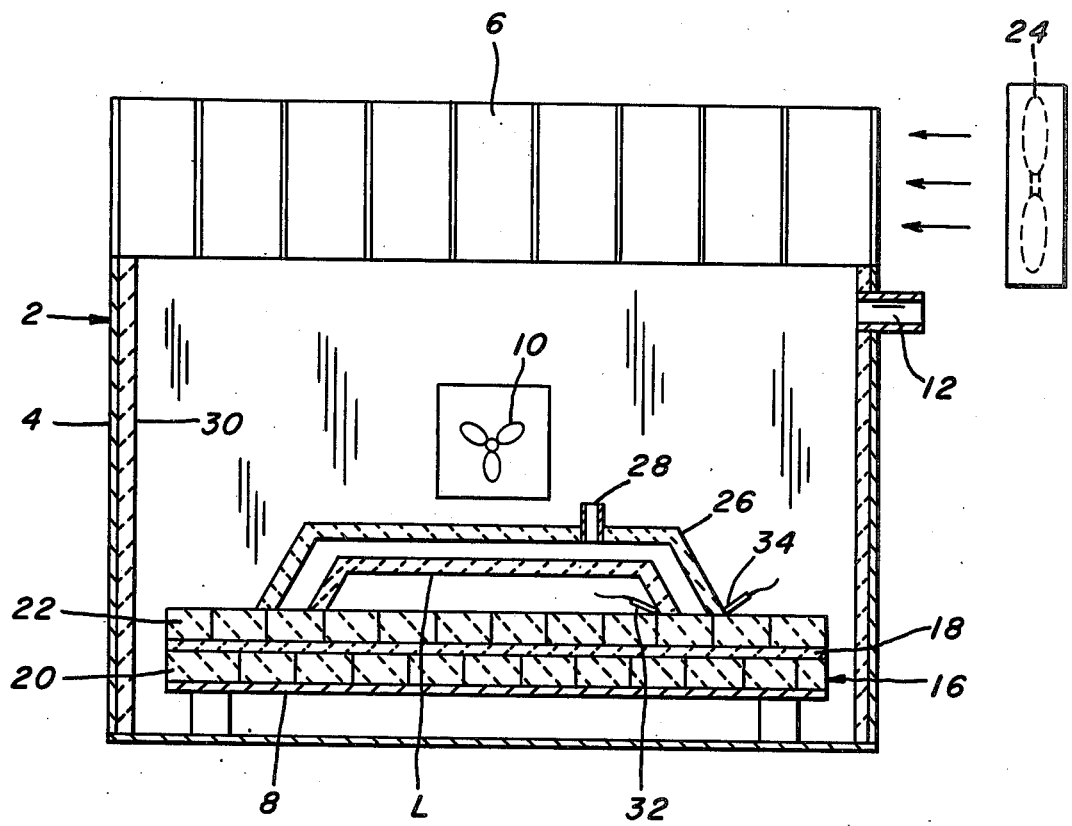
FIG. 1 is a sectional view of apparatus of our invention.

Referring more particularly to FIG. 1 of the drawings reference numeral 2 indicates a microwave furnace which includes a metal chamber 4, preferbly made of aluminum, conventional magnetron radiators 6 positioned outside and at the top of the chamber for supplying microwave energy radiation, and a support table 8. The above described structure is generally similar to a conventional microwave oven. Other microwave producing means may be used in place of the magnetron radiators.

In accordance with the present invention, microwave furnace 2 includes an exhaust fan 10 located on the wall of the chamber 4 and a vapor or steam vent 12 near the top thereof extending through the walls of the enclosure. Placed on top of the support table 8 is a thermal insulator 16 transparent to microwave energy and which consists of a ceramic fiber blanket insulator 18 positioned between two courses of silica firebricks 20 and 22. A fan 24 is provided outside of the enclosure (to cool the magnetron radiators 6).

A load L which is to be heated by means of microwave energy is placed on the firebricks 22. The load L may, for example, be an inverted ceramic refractory basin. The top and sides of the load L are fully enclosed by an enclosure consisting of a ceramic fiber blanket insulation 26 provided with a vent 28 and the insulator 16. The enclosure may also be formed in other ways, such as by covering the load L with material in granular form. The only necessary requirement for the enclosure is that it be entirely transparent or sufficiently transparent to microwave energy to enable the objects to be heated and that it have thermal insulating properties. The ceramic fiber blanket insulation 26 is spaced from the top and sides of the outer surface of the load L to provide for greater heating effect while confining the heat between the ceramic fiber blanket insulators 16 and 26. For additional heat insulation so as to achieve higher temperatures, the inside walls of the chamber are lined with ceramic fiber board insulation 30 approximately 1" in thickness. In order to sense the temperature both internally and externally of the blankets 16 and 26 thermocouples 32 and 34 are provided with suitable connections externally of enclosure 4. A door (not shown) is provided at any suitable location for charging the furnace.

Broadly, the furnace operates as follows. Assuming that the load L is made of a material responsive to microwave energy or has been made responsive according to the teaching of our co-pending application Ser. No. 914,120 filed June 9, 1978, microwaves pass from the radiators 6 through the blanket 26 and cause the load L to heat up. The load L is shown as a castable ceramic basin and is placed upside down so as to hold the heat therein. If the load contains water the initial heating must be relatively slow to drive off the moisture. The moisture formed will pass out through vent 28 and then through vent 12. After substantially all the moisture has been driven off the rate of heating can be increased by putting on more radiators 6. The time required to drive off the moisture will vary depending upon the density of the material with the time increasing as the density increases. The longer the load is heated the more its temperature will rise since the insulators 16 and 26 greatly restrict flow of heat from the load. The insulation 30 further restricts loss of heat. In case the load is made of a material not responsive to microwave energy it can be placed in contact with a strong coupler as set forth in our above identified application. This may be done by making the layer 22 of a strong coupler or by placing the material in a container which is a strong coupler. For example, metal may be melted by placing it in a microwave responsive crucible.

Unlike the ordinary high temperature furnace, our furnace does not have a large mass of refractory which must be heated up slowly before the furnace can be used for its intended purpose and which stores heat, thus making it impossible to change the operational temperature rapidly. Thus our furnace can be changed rapidly from one operating temperature to another.

Figure 2:
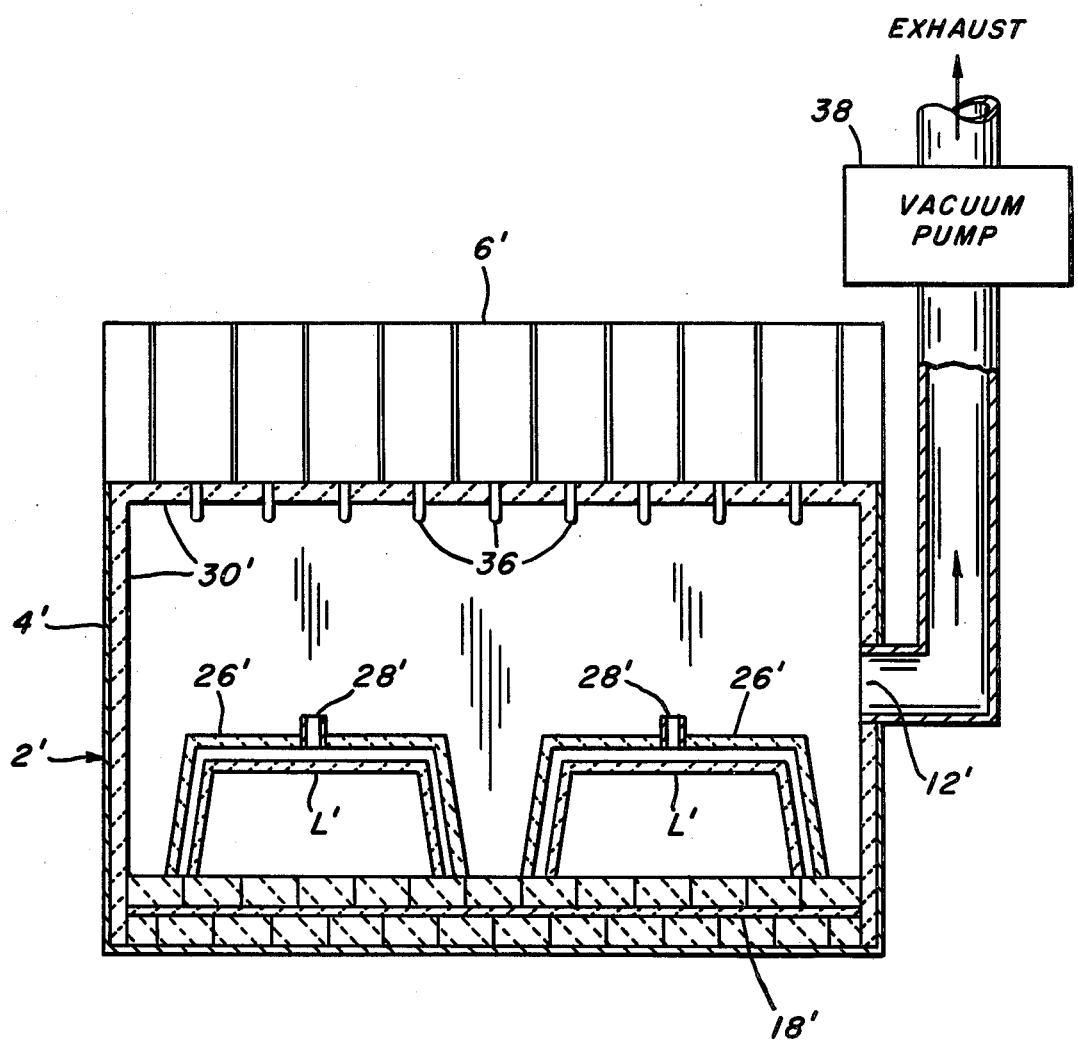
FIG. 2 is a view, similar to FIG. 1, showing a second embodiment of our invention.

FIG. 2 discloses a furnace 2' very similar to that of FIG. 1. In this embodiment the ceramic fiber blanket insulator 18' is placed directly on the base portion of the enclosure 4'. Insulation 30' is placed on the top of the enclosure 4' as well as on the side walls. The magnetron radiators 6' are provided with radiating tubes 36 which extend through insulation 30' into enclosure 4'. A vacuum pump 38 connected to vent 12' will exhaust the moisture from the enclosure. Two loads L' are shown, each beneath a blanket 26' having a vent 28'. The operation of this furnace is essentially the same as that of FIG. 1.

Our invention will now be described with reference to the manufacture of ceramic refractory articles in which a dry mix of Calcium Aluminate cement - alumina powder refractory are mixed with between 8 to 15 percent by weight of water. The percentage of added water, fineness of powder, and other factors depend upon the mix which is desired. The wet mix is cast into molds and then allowed to "set up" in the molds at room temperature for a period of 8 to 24 hours depending on water content, air temperature and humidity. The castings are then removed from the molds. The above steps are conventional. According to our invention this green casting is then placed in the furnace as shown in FIG. 1 but without the cover 26 and microwave power is applied at a concentration of 75 to 100 watts (radiated power) per pound of dry castable until it reaches a temperature between 400 and 500° F. The load is then insulated by loosely wrapping it with 1" Carborundum Fiberfax (or equivalent) ceramic fiber blanket or by a formed fiber board cover. Openings are provided to allow steam to escape. Power of 75 to 100 watts per pound is then applied until load temperature reaches 700 to 800° F., or until most visible steaming has subsided. The load is then wrapped as tightly as possible with an additional 2 or 3 layers of blanket, after which microwave power is restored at as high a level possible, but not exceeding 300 watts per pound of load. Heating continues until the final load temperature (generally 2200° F.) is obtained. Power is then cut and the load is allowed to slow cool inside the insulation.

We have found that the time required for our process is much less than that of the conventional process. For example, a 135 pound shape after being stripped from the mold requires only 7½ hours to become fully fired as compared to between 24 and 32 hours by the conventional method. The quality of the product is equivalent to or superior to that of the conventional process and the yield of good products is much better. No severe cracking has occured to date. It is believed that one reason better results are obtained is because the load is rapidly heated from the inside out.

While several embodiments have been shown and described, it will be apparent to those skilled in the art that various changes and modifications may be made without departing from the spirit and scope of the invention.

We claim:

1. A method of heating a formed cast member of alumina, calcium aluminate cement and water responsive to microwave energy to a temperature above 800° F. which comprises initially heating the object relatively slowly to a temperature between qpproximately 400 and 800° F. by transmitting microwave energy directly thereto until substantially all water is removed therefrom, and then heating the object relatively rapidly by transmitting increased microwave energy directly thereto while the object is enclosed in an enclosure transparent to microwave energy and having thermal insulating properties with the heat being confined within said enclosure.

2. The method of claim 1 in which at least part of the initial heating is obtained by transmitting microwave energy thereto while the object is enclosed in an enclosure transparent to microwave energy and having thermal insulting properties.

3. A method of heating an object having water therein responsive to microwave energy to a temperature above 800° F. which comprises initially heating the object relatively slowly to a temperature between approximately 400 and 800° F. by transmitting microwave energy directly thereto until substantially all water is removed therefrom, said microwave energy being applied during said initial heating step at a concentration of 75 to 100 watts radiated power per pound of the object.

4. The method of claim 3, in which the microwave energy is applied during said second heating step at a concentration as high as possible but not in excess of 300 watts per pound of the dry object until the final desired temperature is reached.

* * * * *